(12) United States Patent
Bynum

(10) Patent No.: US 10,503,400 B2
(45) Date of Patent: Dec. 10, 2019

(54) COMMUNICATION DEVICE FOR USERS WITH LIMITED PHYSICAL DEXTERITY

(71) Applicant: Mark Bynum, Franklin, LA (US)

(72) Inventor: Mark Bynum, Franklin, LA (US)

( * ) Notice: Subject to any disclaimer, the term of this patent is extended or adjusted under 35 U.S.C. 154(b) by 0 days.

(21) Appl. No.: 15/885,293

(22) Filed: Jan. 31, 2018

(65) Prior Publication Data

US 2018/0300055 A1 Oct. 18, 2018

Related U.S. Application Data

(60) Provisional application No. 62/485,306, filed on Apr. 13, 2017.

(51) Int. Cl.
*G06F 3/0488* (2013.01)
*G06F 3/041* (2006.01)
*H04M 1/725* (2006.01)

(52) U.S. Cl.
CPC ........ *G06F 3/04886* (2013.01); *G06F 3/0416* (2013.01); *H04M 1/72588* (2013.01); *G06F 2203/04808* (2013.01); *H04M 2250/22* (2013.01)

(58) Field of Classification Search
CPC ......... G06F 2203/04808; G06F 3/0416; G06F 3/04886; G06F 3/044; G06F 3/0412; G06F 3/03547; G06F 3/041; G06F 1/1626; G06F 1/1613; G06F 1/1671; G06F 1/1698; H04M 1/00; H04M 2250/22; H04M 1/7253; H04M 1/72519; H04M 1/0202; H04M 1/0266; H04M 1/72588
See application file for complete search history.

(56) References Cited

U.S. PATENT DOCUMENTS 6,121,960 A * 9/2000 Carroll .................. G06F 1/1626
  345/169
7,603,143 B2 * 10/2009 Kang .................. H04M 1/0214
  455/550.1

(Continued)

OTHER PUBLICATIONS

BlackBerry Classic Smartphone User Guide, Version: 10.3.3, published Jun. 10, 2016.
LG Electronic Inc. LG-C199 User Guide.

*Primary Examiner* — Hong Zhou
(74) *Attorney, Agent, or Firm* — Blank Rome LLP

(57) ABSTRACT

A communication device for users with limited physical dexterity. More specifically, the presently disclosed technology relates to a communication device, such as a cellular phone, that allows a user having limited physical dexterity to more effectively and accurately provide input into the device. The presently disclosed technology teaches a communication device with at least a touchscreen input device and a physical keyboard, wherein the control capabilities of the touchscreen input device may be disabled and/or re-enabled. The disabling and/or re-enabling may occur based on an input received into an input device or may occur automatically based on the contextual usage of the communication device. Still further, the electronic device may include a touchpad that may comprise a non-slip surface and may be sized and/or shaped such that users with limited physical dexterity may more efficiently navigate the interface of the communication device using the touchpad.

20 Claims, 3 Drawing Sheets

(56) References Cited

U.S. PATENT DOCUMENTS

| | | | | |
|---|---|---|---|---|
| 2005/0085215 | A1* | 4/2005 | Kokko | H04M 1/72541 455/404.1 |
| 2008/0129703 | A1* | 6/2008 | Takeshita | H04M 1/67 345/173 |
| 2008/0188267 | A1* | 8/2008 | Sagong | G06F 1/1626 455/566 |
| 2009/0036100 | A1* | 2/2009 | Lee | H04M 1/67 455/411 |
| 2009/0170553 | A1* | 7/2009 | Wang | H04M 1/66 455/550.1 |
| 2009/0187676 | A1* | 7/2009 | Griffin | H04M 1/67 710/14 |
| 2009/0197615 | A1* | 8/2009 | Kim | H04M 1/605 455/456.1 |
| 2009/0322699 | A1* | 12/2009 | Hansson | G06F 3/0416 345/174 |
| 2010/0099394 | A1* | 4/2010 | Hainzl | G06F 1/32 455/418 |
| 2010/0188268 | A1* | 7/2010 | Grignani | G06F 3/03547 341/22 |
| 2011/0069010 | A1* | 3/2011 | Yi | G06F 3/0202 345/169 |
| 2011/0300829 | A1* | 12/2011 | Nurmi | G06F 1/1616 455/411 |
| 2013/0019207 | A1* | 1/2013 | Rothkopf | G06F 1/1632 715/835 |
| 2016/0117037 | A1* | 4/2016 | Wang | G06F 3/0416 455/566 |
| 2016/0306473 | A1* | 10/2016 | Lee | G06F 3/0412 |

* cited by examiner

COMMUNICATION DEVICE FOR USERS WITH LIMITED PHYSICAL DEXTERITY

CROSS-REFERENCE TO RELATED APPLICATIONS

This application is related to, and claims priority to, U.S. Provisional Application Ser. No. 62/485,306 filed on Apr. 13, 2017, which is specifically incorporated by reference for all that it discloses.

FIELD OF THE INVENTION

The invention relates generally to an improved electronic apparatus and system for users having limited physical dexterity, such as quadriplegics.

BACKGROUND

Conventional communication devices, such as cellular telephones, have graphical user interfaces (GUIs) that may be navigated using a touchscreen. In addition to navigating the GUI via the touchscreen, many of these devices also allow a user to input information into the device using a virtual keyboard that is presented graphically on the touchscreen. Thus, conventional touchscreens allow users to control a communication device by providing inputs via the touchscreen for the purpose of navigating the GUI or providing keystroke inputs. Typically, the virtual keyboard will appear when a user needs to input information (e.g., for the purpose of creating a text message) and disappear when the user is simply using the device to view information (e.g., a captured photo). A virtual keyboard may provide advantages over a physical keyboard. For instance, when a virtual keyboard is a feature of a communication device a physical keyboard may not be necessary. By eliminating the need for a physical keyboard, a larger touchscreen display may be used. However, users having limited physical dexterity, such as quadriplegics, may have reduced hand function that makes it very difficult to control the device using the touchscreen. More specifically, touchscreens are typically very sensitive to touch such that even the slightest touch will be detected as a user input by the screen. This high sensitivity is particularly problematic for users with limited hand dexterity, because the likelihood of inadvertent touching of the touchscreen is increased and leads to frequent mistakes, especially when attempting to input using a virtual keyboard. Thus, a communication device that relies on touchscreen inputs may have drawbacks for users with limited hand dexterity.

In addition to a touchscreen, certain communication devices may also include a physical keyboard (for providing keystroke inputs) and/or a small track pad (for navigating the GUI). For example, as shown in FIG. 1, such devices 100 may include a touchscreen display 105 that resides directly above a small track pad 110 and a physical keyboard 115 beneath the small track pad 110. While the physical keyboard 115 may make it easier for a user with limited physical dexterity to input key strokes into the device 100, inadvertent touching of the touchscreen 105 may still occur. For example, a user's fingers may slip off a key of the physical keyboard 115 and make unintended contact that is registered by the touchscreen display 105. As such, even when a communication device includes a physical keyboard 115 in addition to a touchscreen 105, there may still be drawbacks for users with limited hand dexterity.

With regard to the small trackpad 110, its limited size and slick surface may also present problems for users with limited physical hand dexterity. For instance, the small size of the small trackpad 110 may make it difficult for the user to maintain contact with the small trackpad 110 as the user navigates the GUI. Additionally, the slick surface of the small track pad no may allow the finger of the user to more easily slide off the small trackpad 110 and make unintended contact with the touchscreen 105.

In view of at least the reasons above, a need remains for an improved communication device that assists a user with limited physical dexterity in more effectively and accurately inputting information into a communication device and navigating the GUI of such a device.

SUMMARY OF THE INVENTION

Implementations of the disclosed technology relate to an improved electronic device for users having limited physical dexterity. In one embodiment, the electronic device may be a cellular phone having a fully integrated body and a front facing side. The cellular phone may have a transceiver that allows for wireless communication with a cellular base station. The electronic device may include a plurality of input devices, such as a touchscreen display, a physical keyboard, and a trackpad, all of which are accessible from the front facing side of the device. The touchscreen display may be disabled and re-enabled via user inputs, or the electronic device may be programmed to automatically disable and re-enable the device depending on the context of the use of the device. The trackpad may include a non-slip surface, such as a textured surface, and may extend from about one edge of a face of the electronic device to about an opposite edge of the face of the electronic device.

BRIEF DESCRIPTION OF THE FIGURES

The accompanying drawings, which are incorporated in and constitute a part of this specification, illustrate an implementation of apparatuses that together with the detailed description, serve to explain advantages and principles consistent with the invention.

DETAILED DESCRIPTION

Figure 2A:
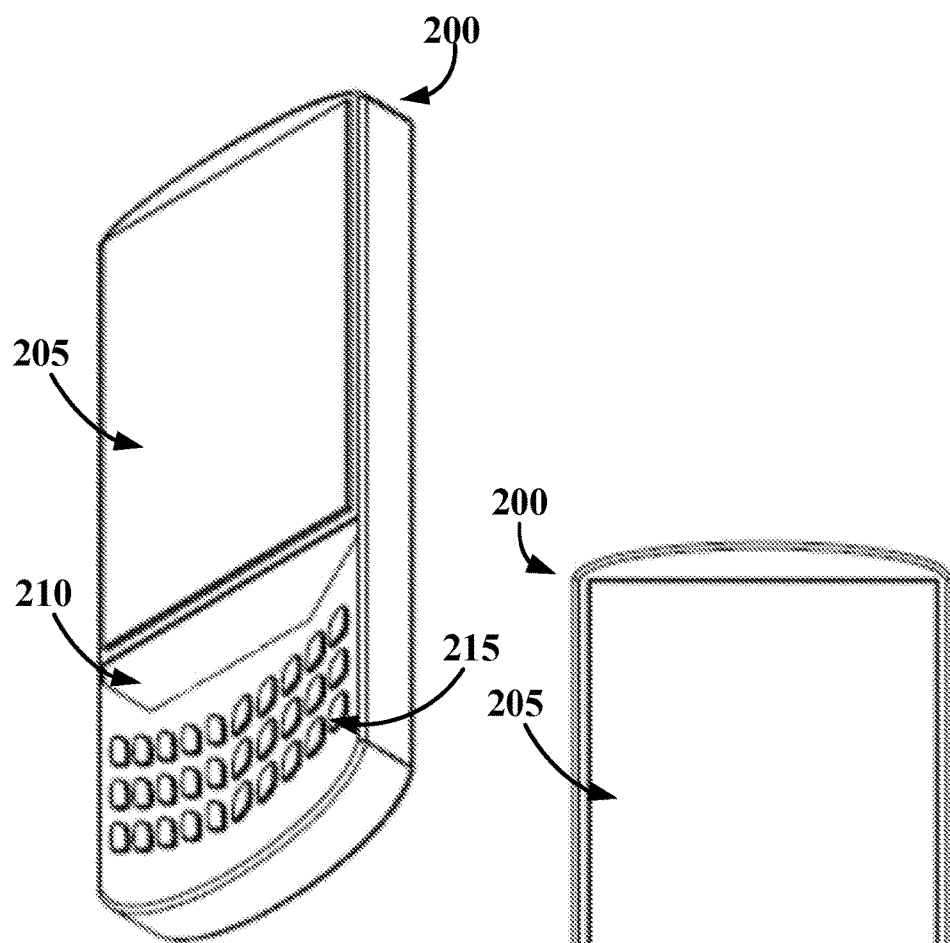
FIGS. 2A and 2B illustrate a cellular phone in accordance with an embodiment of the claimed invention.
Figure 2B:
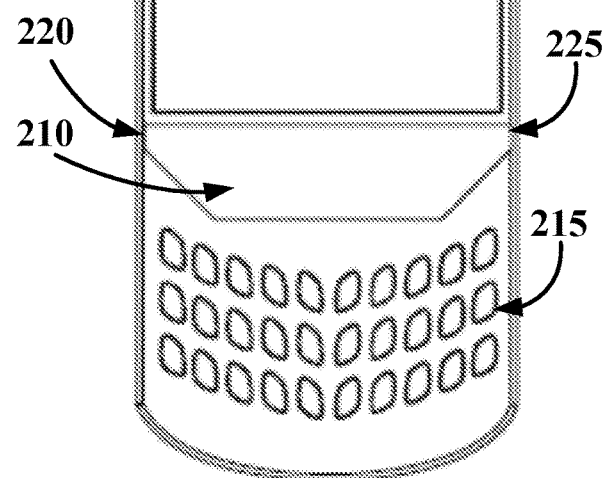

Multiple embodiments of a communication device are discussed herein, such as cellular phone 200 as shown in FIGS. 2A and 2B. Generally, the communication device 200 is a fully integrated device comprising an elongated body and a front facing side having three accessible input devices: a touchscreen display 205, a large trackpad/touchpad 210, and a physical keyboard 215. The physical keyboard 215 may be any type of keyboard known in the art, including but not limited to a QWERTY, Dvorak or Colemak keyboard. References to the term trackpads herein should be understood to encompass touchpads and vice versa. While the trackpad 210 shown is fully integrated as part of the cellular phone 200, the trackpad 210 may be detachable. For example, the trackpad 210 may be part of a module that can easily be joined and separated from the cellular phone 200.

The trackpad 210 may be located anywhere on the front facing side that is not occupied by the touchscreen display 205 or physical keypad 215. For example, the trackpad 210 may be located at the bottom of the front facing side, as opposed to the middle as illustrated in FIGS. 2A and 2B. Those of ordinary skill in the art would appreciate that such a design may make it easier to build/assemble the cellular phone 200 and may open a number of retrofit possibilities. The touchscreen display 205 may comprise any known touchscreen technology in the art, including but not limited to resistive, capacitive, and surface-wave touchscreen technologies. The communication device 200 may also include additional buttons (not shown) that are programmed to carry out a specific function(s). For example, a button on the side of the communication device 200 may be programmed to turn off the communication device 200 when pressed. The button may be pre-programmed to correspond to the function or the button may be programmed by a user to correspond to the function.

Figure 3:
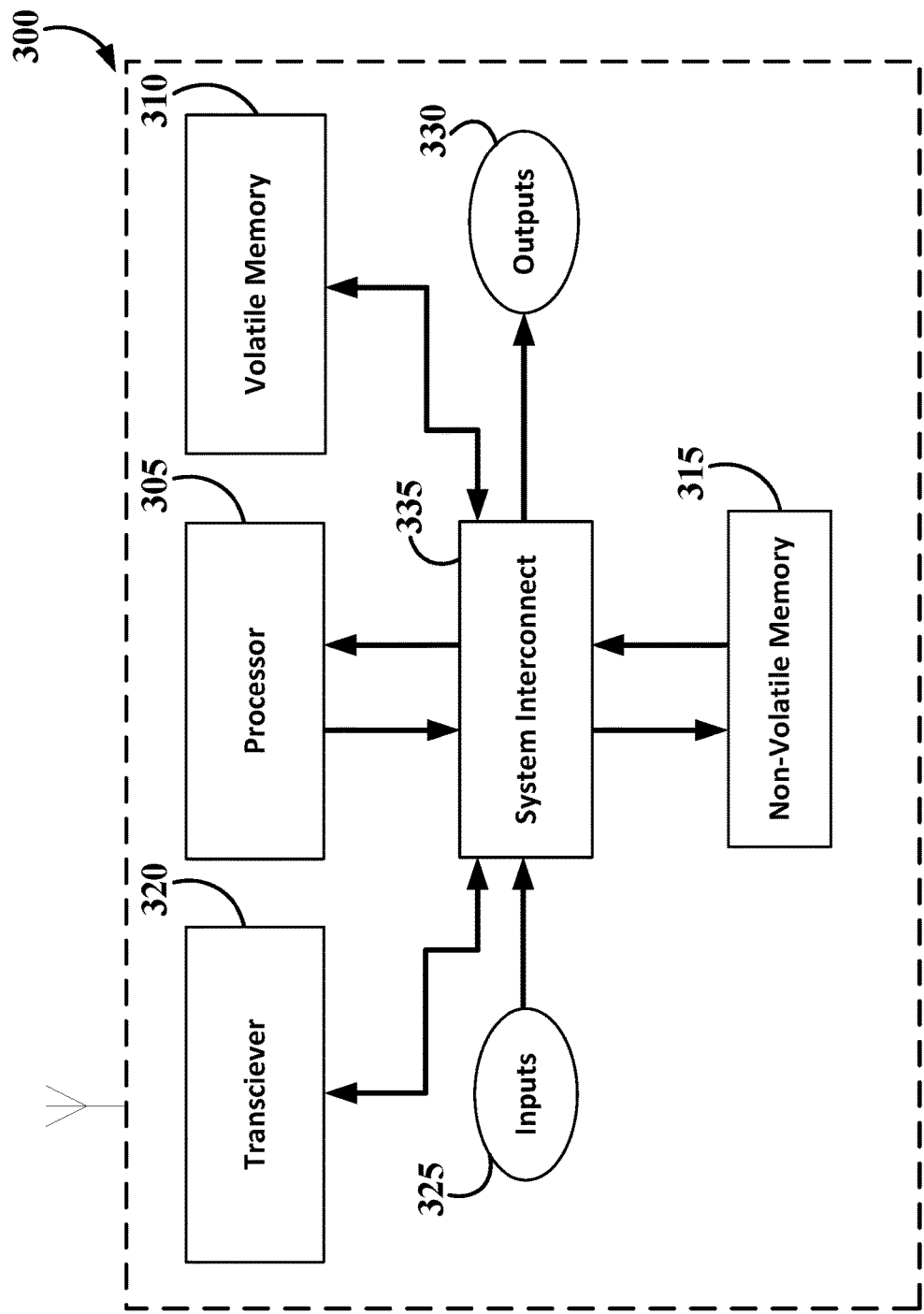
FIG. 3 provides an illustration of various electronic components within the embodiment illustrated in FIGS. 2A and 2B.

The communication device discussed herein may include internal components, such as the internal components 300 illustrated in FIG. 3. The internal components 300 may include a processor 305 (e.g., a Qualcomm® Snapdragon™ processor), volatile memory 310 (e.g., random-access memory), non-volatile memory 315 (e.g., flash memory), transceiver 320 (e.g., a 4G LTE transceiver and/or Wi-Fi and/or BlueTooth), input devices 325 (e.g., physical keyboard, touchscreen, trackpad, microphone, camera) and output devices 330 (e.g., a liquid crystal display, speakers). These components may be connected via a system interconnect 310, which allows them to communicate with one another. The device 200 may operate using an operating system, such as an Android or Apple iOS operating system. The memory 315 may contain programs that cause the processor 305 to operate the communication device, including a program that causes the processor 305 to interact with the input devices 325.

Figure 1:
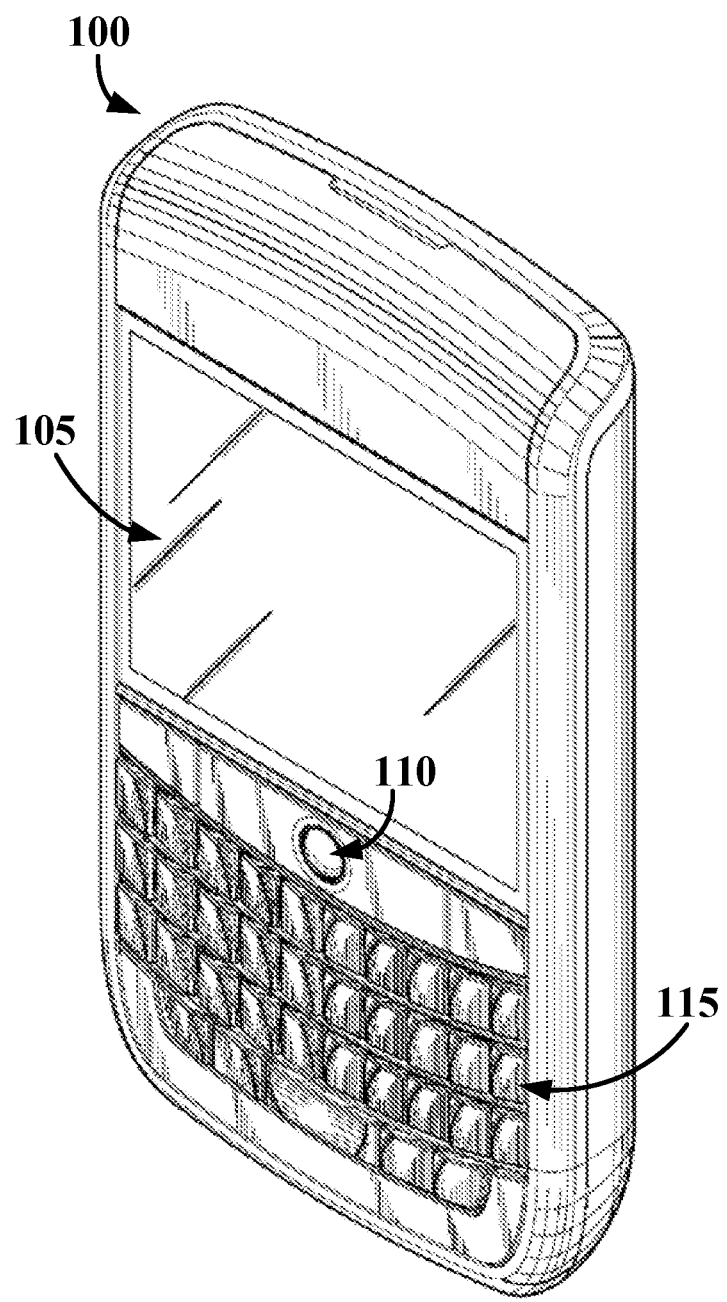
FIG. 1 illustrates a prior art cellular phone comprising a touchscreen, physical keyboard, and track pad.

In reference to FIGS. 2A and 2B, an embodiment of the present invention may include a touchscreen 205 that occupies a majority of the front facing side of a communication device 200. A trackpad 210 beneath the touchscreen display 205 may extend from one vertical edge 220 of the front facing side of the communication device 200 to an opposing vertical edge 225 of the front facing side of the communication device 200. The trackpad 210 may comprise a non-slip surface layer, such as a textured layer, that helps reduce the slickness of the trackpad 210. The trackpad 210 may take a hexagonal shape and may be operated by a thumb of a user. It will be appreciated by those having ordinary skill in the art that the trackpad 210 provides an advantage for users with limited physical hand dexterity as compared to the trackpad 110 shown in FIG. 1. More specifically, the addition of a larger trackpad 210, which extends from one vertical edge 220 to an opposing vertical edge 225, makes it easier for a user to maintain contact with the trackpad 210, while the non-slip surface reduces the likelihood that a user's finger will inadvertently slide off the trackpad 210. Further, the large size of the trackpad 210 allows for a reduced effective resolution, meaning that movements on the trackpad 210 are larger for a given operation than on the small trackpad 110. Therefore, the trackpad 210 has a lesser apparent sensitivity than the small trackpad 110, making it easier for users with limited hand dexterity to operate the cellular phone 200, as a small movement on the trackpad 210 will move a cursor much less than the same small movement on the small trackpad 110.

The cellular phone 200 may also further comprise a fingerprint identity sensor as one of the input devices, which provides additional security on the cellular phone. The fingerprint identity sensor may be separate from all other input devices, including the trackpad 210. Alternatively, the fingerprint identity sensor may be part of the trackpad 210 such that a user can place one of his or her fingers on a portion of the trackpad 210 to allow the fingerprint identity sensor to scan the finger. The fingerprint identity sensor may overlap with the entire area of the trackpad 210 or may only be a portion of the total area of the trackpad 210. For example, the lower right quadrant of the trackpad 210 may comprise a fingerprint identity sensor such that a user can only access the cellular phone using his or her finger while touching that particular quadrant. While the touchscreen display 205 may be used by a user to control the operation of the device 200, this capability may be disabled. For example, the touchscreen technology of the touchscreen display 205 (e.g., the resistive touchscreen technology) may be disabled such that user touches of the touchscreen display 205 do not register as touchscreen inputs. Alternatively, the touchscreen technology may remain enabled, but software and/or hardware programming may prevent touchscreen inputs from being processed or registered by the operating system, such that when a user touches the touchscreen display 205 nothing happens. It will be appreciated by those having ordinary skill in the art that allowing a user to disable the control capabilities of the touchscreen 205 provides an advantage for users having limited physical dexterity over the communication device 100 of the prior art. Specifically, by disabling the control capabilities of the touchscreen 205, inadvertent touching of the touchscreen 205 will no longer cause the communication device 200 to operate in an unintended manner. The control capabilities may be disabled in a number of different ways, as discussed below.

The operating system of the device 200 may provide settings that are accessible via the GUI of the operating system. A user may navigate to these settings to disable the control capabilities of the touchscreen using, for example, the trackpad 210.

The control capabilities of the touchscreen may be disabled by a single input, or the combination of multiple inputs. For instance, the device 200 may include a button (e.g., on the side of the device) that is pre-programmed to disable the control capabilities when pressed and quickly released. The button may be a larger button compared to all other buttons on the device 200, which may make it easier for users with limited physical dexterity to disable the touchscreen control capabilities. Alternatively, the button may disable the control capabilities of the touchscreen when it is pressed and held for a certain amount of time (e.g., 3 seconds). By requiring that the button be held for a period of time, it may reduce the likelihood that the control capabilities of the touchscreen are inadvertently disabled. The button may be one of the buttons of the keyboard 215, or the button may be completely separate and distinct from the keyboard 215.

The control capabilities of the touchscreen may be disabled by maintaining contact with a portion of the touchscreen 205 for a certain period of time. For example, contacting the lower right corner of the touchscreen 205 for a period of three seconds may disable the control capabilities. Likewise, double tapping the lower right portion of the touchscreen 205 may also disable the control capabilities.

The control capabilities may be disabled by pressing a combination of buttons at the same time. For example, pressing and holding two different buttons on the keyboard 210 for a certain period of time (e.g., two seconds) may disable the control capabilities of the touchscreen 205. Additionally, a user may program any desired input to cause the control capabilities of the touchscreen to be disabled. For example, the operating system may provide settings in the GUI that allow a user to assign a button to the function of disabling the control capabilities of the touchscreen. Such assignability may provide a user with additional flexibility to test various inputs for disabling the control capabilities of the touchscreen and use the input that works best for that particular user.

Additionally, the control capabilities of the touchscreen may automatically disable when a user begins using the trackpad 210 and/or physical keyboard 215. The control capabilities may remain disabled for a fixed period of time (e.g., two minutes) starting from the time the most recent input was received via the trackpad 210 and/or physical keyboard 215. As yet another example, the control capabilities of the touchscreen may automatically disable based on the context of usage of the device. For example, the control capabilities may be automatically disabled based on the application or program being used by a user. For instance, when a user is using a text messaging application, the control capabilities may be disabled because it may be more common for a user to use the physical keyboard 215 when such an application is in use. Conversely, the control capabilities of the touchscreen may automatically re-enable when the user uses a program for reading electronic books because touchscreen navigation may be more convenient for reading e-books. Alternatively, the control capabilities may remain disabled until a user manually re-enables those capabilities.

The control capabilities of the touchscreen may also be disabled using voice commands. For example, when a user speaks "disable touchscreen" loudly enough, a microphone within the communication device 200 will capture that audio. Voice recognition software stored in the memory of the communication device 200 will be used by the processor to process the audio and determine whether the audio satisfies the voice analysis criteria required to disable the control capabilities. If so, the processor of the device 200 will disable the control capabilities of the touchscreen.

The control capabilities of the touchscreen may be re-enabled in the same manner in which they were originally disabled. For example, if a press and quick release of a button causes the control capabilities to disable, a press and quick release of the same button may cause the control capabilities of the touchscreen to re-enable. Similarly, if a voice command was used to disable the control capabilities, the same voice command may be used to re-enable the control capabilities. Alternatively, the control capabilities of the touchscreen may be re-enabled in a manner that is different than the manner used to disable the control capabilities. For example, if a press and quick release of a button disabled the control capabilities, pressing and holding the same button for a certain period of time (e.g., 3 seconds) may be required to re-enable the touchscreen. Likewise, the voice command used to re-enable the control capabilities (e.g., "enable touchscreen") may be different than the voice command used to disable the control capabilities (e.g., "disable touchscreen").

While the disclosed embodiments provides numerous examples of ways in which the control capabilities of the touchscreen can be disabled and re-enabled, those having ordinary skill in the art would appreciate that any input or combination of known inputs could be used to cause the control capabilities of the touchscreen to enable or disable.

Those having ordinary skill in the art would appreciate that the ability to disable and re-enable the control capabilities of the touchscreen 205 provides a number of advantages. For one, it may be desirable for users having limited physical hand dexterity to use the touchscreen control capabilities in certain situations, but not in others. For example, when such a user intends on writing a text message it may be desirable to disable the control capabilities of the touchscreen because inadvertent touching of the touchscreen is more likely. Conversely, when such a user is using the communication device 200 for the sole purpose of reading a website or electronic book (e-book), it may be easier to navigate the pages using the touchscreen as opposed to the trackpad 215 or physical keyboard 210 and thus the user may desire to use the control capabilities of the touchscreen. Moreover, the ability to disable and re-enable the touchscreen 205 may increase the resale value of the communication device 200 in the market. For example, the communication device 200 may be more desirable to potential purchasers that do not have limited hand dexterity if the touchscreen 205 can be re-enabled.

Those having ordinary skill in the art would appreciate that certain prior art cellular phones, such as certain versions of the Apple® iPhone® may disable the phones' touchscreen control capabilities based on the sensed presence of a large obstruction (e.g., a user's head) by a sensor (e.g., a proximity sensor) near the touchscreen display during a phone call. Such a feature is intended to prevent the inadvertent input of information into the touchscreen during a phone call, which may occur when, for example, a user's ear physically contacts the touchscreen during a phone call. One of ordinary skill would appreciate that in the disclosed embodiments of the present invention the ability to disable and re-enable the control capabilities of the touchscreen is much different from that feature. Specifically, in the disclosed embodiments the touchscreen control capabilities may be disabled and may remain disabled while the view of the touchscreen is unobstructed. This means that the touchscreen display 205 and the other inputs (e.g., physical keypad 215 and trackpad 210) are fully viewable and easily accessible to the user when the control capabilities are disabled such that the phone can still be effectively used using an input device other than the touchscreen control capabilities. In stark contrast, the feature of the prior art results in the view and accessibility of the touchscreen and other inputs remaining largely obstructed while the touchscreen control capabilities are disabled, which eliminates the ability of the user to effectively navigate the interface of the phone or effectively provide inputs. Thus, in the disclosed embodiments of the present invention, the disabling of the control capabilities of the touchscreen occurs in the absence of a detected obstruction to the touchscreen.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the term "connected" as used in the specification and/or claims should be interpreted to include direct and/or indirect connecting.

The invention claimed is:

1. An improved electronic device for users having limited physical dexterity comprising:
   a body comprising a front facing side;
   a plurality of input devices physically accessible from the front facing side, wherein the plurality of input devices comprises at least a touchscreen display and a physical keyboard;
   a processor internal to the body and coupled to the plurality of input devices;
   memory internal to the body and coupled to the processor, the memory containing programs to cause the processor to operate the electronic device, the programs including a program to cause the processor to interact with the plurality of input devices;
   a transceiver coupled to the processor and adapted to communicate with a base station; and
   a sensor for detecting the presence of an obstruction in front of the touch screen display,
      wherein the processor, when executing a program stored in the memory in the absence of a detected obstruction to the touchscreen by the sensor, disables the control capabilities of the touchscreen display based on a first input received by at least one of the plurality of input devices and re-enables the touchscreen display based on a second input received by at least one of the plurality of input devices.

2. The electronic device of claim 1, wherein at least one of the plurality of input devices is a touchpad comprising a non-slip surface.

3. The electronic device of claim 2, wherein the touchpad has a first edge adjacent a first vertical edge of the front facing side and a second edge adjacent a second vertical edge of the front facing side.

4. The electronic device of claim 3, wherein the touchpad has a hexagonal shape.

5. The electronic device of claim 2, wherein the touchpad is detachable.

6. The electronic device of claim 1, wherein at least one of the plurality of input devices is a touchpad comprising a fingerprint identity sensor.

7. The electronic device of claim 1, wherein the first input and second input are different.

8. The electronic device of claim 1, wherein the first input and second input are programmable by a user using a graphical user interface of the electronic device.

9. The electronic device of claim 1, wherein at least one of the plurality of input devices is a microphone and at least one of the first or second inputs is an audio input.

10. An improved electronic device for users having limited physical dexterity comprising:
    a body comprising a front facing side;
    a plurality of input devices physically accessible from the front facing side, wherein the plurality of input devices comprises at least a touchscreen display and a physical keyboard;
    a processor internal to the body and coupled to the plurality of input devices; memory internal to the body and coupled to the processor, the memory containing programs to cause the processor to operate the electronic device, the programs including a program to cause the processor to interact with the plurality of input devices;
    a transceiver coupled to the processor and adapted to communicate with a base station; and
    a sensor for detecting the presence of an obstruction in front of the touch screen display,
       wherein the processor, when executing a program in the memory in the absence of a detected obstruction to the touchscreen by the sensor, automatically disables the control capabilities of the touchscreen display based on the contextual usage of the device by a user of the touchscreen.

11. The electronic device of claim 10, wherein at least one of the plurality of input devices is a touchpad comprising a non-slip surface.

12. The electronic device of claim 11, wherein the touchpad has a first edge adjacent a first vertical edge of the front facing side and a second edge adjacent a second vertical edge of the front facing side.

13. The electronic device of claim 11, wherein the touchpad is detachable.

14. The electronic device of claim 10, wherein the processor automatically disables the control capabilities of the touchscreen display.

15. The electronic device of claim 10, wherein the processor automatically re-enables the control capabilities of the touchscreen display.

16. The electronic device of claim 10, wherein the processor automatically disables or re-enables the control capabilities of the touchscreen display based on which application is being used by a user.

17. An improved electronic device for users having limited physical dexterity comprising:
    a plurality of input devices, wherein the plurality of input devices comprises at least a touchscreen display and a physical keyboard;
    a processor;
    memory containing programs to cause the processor to operate the electronic device, the programs including a program to cause the processor to interact with the plurality of input devices;
    a transceiver;
    a system interconnect coupled to the plurality of input devices, processor, memory, and transceiver; and
    a sensor for detecting the presence of an obstruction in front of the touch screen display,
       wherein the processor, when executing a program in the memory in the absence of a detected obstruction to the touchscreen by the sensor, disables the control capabilities of the touchscreen display based on a user input or automatically based on the contextual usage of the device by a user of the touch screen.

18. The electronic device of claim 17, wherein at least one of the plurality of input devices is a touchpad comprising a non-slip surface.

19. The electronic device of claim 18, wherein the touchpad is detachable.

20. The electronic device of claim 17, wherein the processor further re-enables the control capabilities of the touchscreen display based on a user input or automatically based on contextual usage information of the device.

* * * * *